US005302438A

United States Patent [19]

[11] Patent Number: 5,302,438

Komamura et al.

[45] Date of Patent: Apr. 12, 1994

[54] PHOTOGRAPHIC-IMAGE-BEARING RECORDING MEMBER AND METHOD OF ITS PREPARATION

[75] Inventors: Tawara Komamura, Hachioji; Takao Nimura, Fuchu; Taketo Nozu, Hino, all of Japan

[73] Assignee: Konica Corporation, Tokyo, Japan

[21] Appl. No.: 5,162

[22] Filed: Jan. 15, 1993

Related U.S. Application Data

[63] Continuation of Ser. No. 620,643, Dec. 3, 1990, abandoned.

[30] Foreign Application Priority Data

Dec. 5, 1989 [JP] Japan .................................. 1-315925

[51] Int. Cl.[5] ............................................ B32B 9/00

[52] U.S. Cl. .................................... 428/195; 428/76; 428/474.4; 428/480; 428/500; 428/524; 428/913

[58] Field of Search .............. 428/76, 195, 913, 474.4, 428/480, 500, 524, 913

[56] References Cited

U.S. PATENT DOCUMENTS

| | | | |
|---|---|---|---|
| 4,006,050 | 2/1977 | Hurst et al. | 156/234 |
| 4,054,455 | 10/1977 | Schlesinger et al. | 96/86 P |
| 4,058,401 | 11/1977 | Crivello | 526/192 |
| 4,069,055 | 1/1978 | Crivello | 260/327 B |
| 4,097,279 | 6/1978 | Whitehead | 430/39 |
| 4,101,513 | 7/1978 | Fox et al. | 526/192 |
| 4,161,478 | 7/1979 | Crivello | 260/327 B |
| 4,206,025 | 6/1980 | Vrancken et al. . | |
| 4,227,979 | 10/1980 | Humke et al. | 204/159.16 |
| 4,234,214 | 11/1980 | Lee . | |
| 4,262,072 | 4/1981 | Wendling et al. | 430/14 |
| 4,303,924 | 12/1981 | Young, Jr. . | |
| 4,389,472 | 6/1983 | Neuhaus et al. | 430/14 |
| 4,426,431 | 1/1984 | Harasta et al. . | |
| 4,427,764 | 1/1984 | Tachibana et al. . | |
| 4,592,976 | 6/1986 | Whitehead | 430/10 |
| 4,617,194 | 10/1986 | Scott et al. | 427/54.1 |
| 4,668,601 | 5/1987 | Kistner . | |

FOREIGN PATENT DOCUMENTS

| | | |
|---|---|---|
| 031521 | 7/1981 | European Pat. Off. . |
| 189125 | 7/1986 | European Pat. Off. . |
| 62-229133 | 10/1987 | Japan . |

*Primary Examiner*—Patrick J. Ryan
*Assistant Examiner*—William A. Krynski
*Attorney, Agent, or Firm*—Finnegan, Henderson, Farabow, Garrett & Dunner

[57] ABSTRACT

A photographic image-bearing recording member and a manufacturing method of it are disclosed. The recording member comprises a support, a thermoplastic resin layer bearing a photographic image, which is provided on a surface of said support, and a protective layer comprising a radiation setting composition and being set with irradiation of an actinic radiation, which is provided at a outermost position of the side of the support on which said thermoplastic layer is provided. Symbols or characters may be further beared in the thermoplastic layer. The symbols and characters are preferably formed on the themopastic layer by the heat-transfer printing method.

8 Claims, 2 Drawing Sheets

PHOTOGRAPHIC-IMAGE-BEARING RECORDING MEMBER AND METHOD OF ITS PREPARATION

This application is a continuation of application Ser. No. 07/620,643, filed Dec. 3, 1990, now abandoned.

FIELD OF THE INVENTION

The present invention relates to the improvement of a photographic-image-bearing recording member wherein the photographic image is recorded in thermoplastic resin and a method of its preparation wherein the photographic image is stably recorded in thermoplastic resin. More specifically, the present invention relates to a photographic-image-bearing recording member which is easy to produce and which offers good image stability and a method of preparing such a photographic-image-bearing recording member. The inventive photographic-image-bearing recording member serves very well as an identification card or ID card, for instance.

BACKGROUND OF THE INVENTION

Traditionally, there have been commonly used those cards wherein necessary data such as information on the card bearer's address, name, number and other items for personal identification, entered by printing etc., are given on the surface of a platy support of paper, plastic or another material and a photograph or another piece of personal information is applied thereto and marked with an overlapping seal, as certificate identification cards such as employee cards, credit cards, driving LICENSES certificates and traffic permits.

However, these kinds of cards are faulty in that forgery and alteration are easy to do. Also, since these cards are not resistant to friction etc., they often become dirty or damaged while being conveyed routinely. As a solution to this drawback, there have recently been used those cards wherein a light-sensitive material prepared by coating a light-sensitive emulsion such as silver halide emulsion on a platy support is used to print personal data and a photographic portrait. Also known are those cards designed in different ways to prevent falsification, such as those prepared by coating and thermally sealing such cards with resin film, and those prepared by laminating such cards with resin film on both faces.

However, these methods using a light-sensitive material are faulty in that a troublesome liquid processing and a large scale apparatus are required for image formation. To overcome these shortcomings, Japanese Patent Application Nos. 131939/1988 and 293977/1988 propose a method of image formation, especially for ID card image, by forming an image in a thermoplastic resin layer by thermal transfer printing or transferring an image formed in a heat developing type silver halide light sensitive material and laminating this resin layer with an appropriate lamination material.

Although this method permits the obtainment of an image through a simple and dry process, the obtained image is unsatisfactory as to storage stability and sharpness. Particularly, deterioration of sharpness is obtained due to heating upon lamination.

Also, the contact between thermoplastic resin and lamination material in the obtained recording member is insufficient, which poses a problem on the storage and prevention of falsification of the recording member.

This problem tends to become aggravated when lamination temperature or lamination material is changed to lower the degree of deterioration of sharpness.

In addition, in issuing various certificates such as ID cards and pamphlets, there have been demands of applicants for shortening the time lag between the submission of application form and the issuance of certificate whereas there have been demands of issuers for minimizing issuing time per certificate since they must do enormous tasks in a given time.

SUMMARY OF THE INVENTION

It is the first object of the present invention to provide a photographic-image-bearing recording member which is easy to prepare and which is suitable to use for ID cards etc., and a method of its preparation.

It is the second object of the present invention to provide a photographic-image-bearing recording member which offers improved image storability and sharpness and a method of its preparation.

It is the third object of the present invention to provide a photographic-image-bearing recording member which excellently prevents falsification and a method of its preparation.

It is the fourth object of the present invention to provide a photographic-image-bearing recording member which offers excellent image preservability and sharpness quickly and at low cost.

The objects described above are accomplished by means of the following photographic image-bearing recording member and a manufacturing method thereof. The recording member comprises a support, a thermoplastic resin layer bearing a photographic image, which is provided on a surface of said support, and a protective layer comprising a radiation setting composition and being set with irradiation of an actinic radiation, which is provided at an outermost position of the side of the support on which said thermoplastic layer is provided.

The recording member is manufactured by the method comprising steps of forming a photographic image composed of a dye or a pigment on a thermoplastic layer provided on a support, providing a layer of radiation setting composition on said thermoplastic layer on which said photographic image is formed, and irradiating said radiation setting composition layer with an actinic radiation for setting said radiation setting composition and to form a protective layer.

Symbols or characters may be further borne in the thermoplastic layer.

The recording member may be borne a symbol or character on the thermoplastic layer by the heat-transfer printing method using a melt-type heat-transfer material.

DETAILED DESCRIPTION OF THE INVENTION

Figure 1:
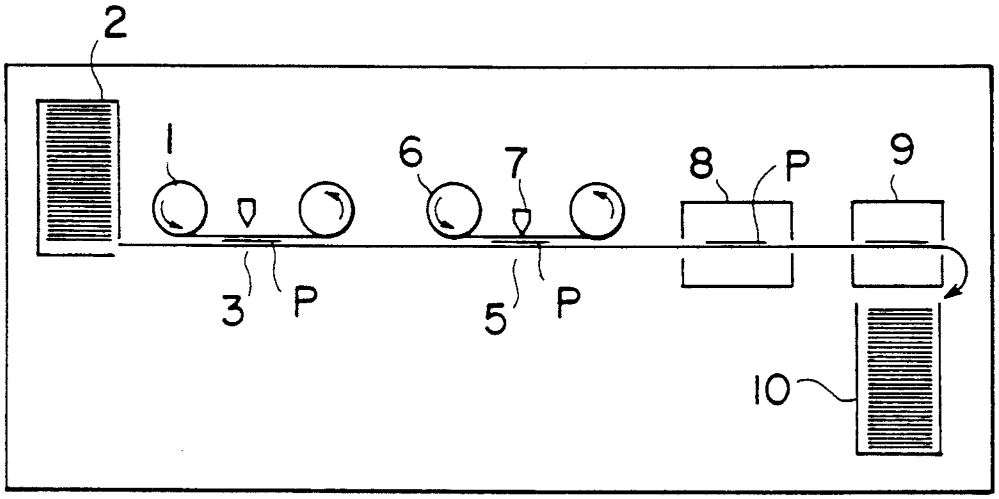
FIGS. 1 and 2 are schematic diagrams of image forming apparatuses.

Any photographic image of this invention means an image having a gradation of not less than 32 grades. In the present invention, a symbol is defined as an optically readable symbol such as a bar code or OMR symbol, or a simple pattern such as a seal or the issuer's mark.

Any support can be used for the present invention, whether it is transparent or opaque. Examples of supports include films of polyethylene terephthalate, polycarbonate, polystyrene, polyvinyl chloride, polyethylene, polypropylene, those obtained by adding a pigment such as titanium oxide, barium sulfate, calcium carbonate or talc to these supports, barayta paper, RC paper, which is obtained by laminating a pigment-containing thermoplastic resin on paper, cloth, glass, metal such as aluminum, those obtained by coating and setting a pigment-containing electron beam setting resin composition on these supports, and those prepared by forming a pigment-containing coating layer on these supports. The cast coat paper described in Japanese Patent Publication Open to Public Inspection No. 283333/1987 also serves well as a support.

The preferred supports are white plastic film supports, e.g., polyethylene terephthalate, polycarbonate, polyvinyl chloride, with further preference given to polyvinyl chloride supports.

Also, an IC device or a magnetic recording layer may be present in the support itself or between the support and the thermoplastic resin layer. Furthermore, paper may be attached onto the back of the support to provide writability.

Examples of the binder for thermoplastic resin layer of the present invention include polyvinyl chloride resins, copolymer resins of vinyl chloride and another monomer e.g., vinyl chloride-vinyl acetate copolymer resins, ethylene-vinyl chloride copolymers, polyester resins e.g., polyethylene terephthalate, polyacrylates, chlorinated polyethylene, ethylene-vinyl acetate copolymers, ketone resins, alkyd resins, polyvinylpyrrolidone, polycarbonates e.g., bisphenol A polycarbonate, cellulose triacetate, polyacrylate resins, styrene acrylate resins, vinyltoluene acrylate resins, polyurethane resins, polyamide resins, urea resins, polycaprolactone resins, styrene-maleic anhydride resins, polyacrylonitrile resins, polystyrene and polyvinyl butyral. These polymers may be used also as supports. In this case, the support may be formed with a single layer or a number of layers. Of these polymers, vinyl chloride-vinyl acetate copolymer resins, polyester resins, polyvinyl chloride resins are preferred. These polymers may be used singly or in combination.

Although the various resins described above may be freshly synthesized, commercial products thereof may be used. Examples of usable commercial polyester resins include Vylon 200, Vylon 290 and Vylon 600 (all produced by Toyobo Corporation), KA-1038C (produced by Arakawa Kagaku), and TP220 and TP235 (both produced by Nippon Synthetic Chemical Industry).

The vinyl chloride-vinyl acetate copolymer resin described above is preferably 50 to 100% by weight in vinyl chloride component content and about 50 to 2500 in the degree of polymerization. The vinyl chloride-vinyl acetate copolymer resin preferred for the present invention may contain a vinyl alcohol component, a maleic acid component and other components in addition to the vinyl chloride component and vinyl acetate component, as long as the object of the present invention is not interfered with. Examples of such vinyl chloride-vinyl acetate copolymers include S-LEC A, S-LEC C and S-LEC M (all produced by Sekisui Chemical Co., Ltd.), Vinylite VACH, Vinylite VYHH, Vinylite VMCH, Vinylite VYHD, Vinylite VYLF, Vinylite VYNS, Vinylite VMCC, Vinylite VMCA, Vinylite VACD, Vinylite VERR and Vinylite VROH (all produced by Union Carbide), Denkavinyl 1000 GKT, Denkavinyl 1000 L, Denkavinyl 1000 CK, Denkavinyl 1000 A, Denkavinyl 1000 LK2, Denkavinyl 1000 AS, Denkavinyl 1000 MT2, Denkavinyl 1000 CSK, Denkavinyl 1000 CS, Denkavinyl 1000 GK, Denkavinyl 1000 GSK, Denkavinyl 1000 GS, Denkavinyl 1000 LT3, Denkavinyl 1000 D and Denkavinyl 1000 W (all produced by Denki Kagaku Kogyo KK).

Judging from the viewpoint of physical properties, the binder for thermoplastic resin layer preferably has a glass transition point (Tg) of −20° to 250° C., more preferably 30° to 240° C., and a molecular weight of 2,000 to 100,000. When forming the image receiving layer, the various resins described above may be cross-linked or set using radiation, heat, moisture, catalyst and other means at their reaction active point, a reaction active point is provided for the resin, if it is absent.

In this case, a radiation active monomer such as epoxy or acrylic and a crosslinking agent such as isocyanate can be used.

The thermoplastic layer may include a polymer having a glass transition temperature of from 40° C. to 250° C. The thermoplastic resin layer may contain a parting agent, an antioxidant, an UV absorbent, an optical stabilizer, a filler (inorganic fine grains, organic fine grains) and a pigment. A plasticizer, a hot solvent and other materials may be added as sensitizers. These substances are used as appropriate in consideration of compatibility with binder, image preservability and other factors.

The parting agent improves the partition between the recording ink sheet and the thermal transfer recording image receiving member when photographic images are formed by sublimational thermal transfer.

Examples of such parting agents include solid waxes such as silicone oil, polyethylene wax, amide wax and Teflon powder; and surfactant such as those based on fluorine or phosphate; with preference given to silicone oil. This silicone oil is available in two types, namely the simple addition type and the setting reaction type. In the case of the simple addition type, it is preferable to use a modified silicone oil because it improves the compatibility with binder.

Examples of modified silicone oils include polyester-modified silicone resins or silicone-modified polyester resins, acryl-modified silicone resins or silicone acryl resins, urethane-modified silicone resins or silicone-modified urethane resins, cellulose-modified silicone resins or silicone-modified cellulose resins, alkyd-modified silicone resins or silicone-modified alkyd resins, and epoxy-modified silicone resins or silicone-modified epoxy resins.

Accordingly, it is also possible to use as modified silicone oils or resins polyester-modified silicone resins wherein polysiloxane resin, present in the main chain, is block-copolymerized with polyester, silicone-modified polyester resins wherein a dimethylpolysiloxane moiety exists as a side chain bound to the polyester main chain, block copolymers, alternate copolymers, graft copolymers and random copolymers of dimethylpolysiloxane and polyester moiety.

In the present invention, it is particularly preferable to add a polyester-modified silicone resin.

Examples of typical polyester-modified silicone resins include copolymers of diol and dibasic acid, caprolactone ring-opening polymer block copolymers of polyester and polysiloxane including copolymers wherein one or both ends of dimethylpolysiloxane are blocked at the polyester moiety described above, and those wherein the polyester described above is blocked by dimethylpolysiloxane, and copolymers comprising the polyester described above as the main chain and (dimethyl)polysiloxane as a side chain.

Although the addition weight of these simple addition type silicone oils cannot be generally specified since it varies according to the kind thereof, it is normally 0.5 to 50% by weight, preferably 1 to 20% by weight, of the image receiving layer binder.

Examples of setting reaction type silicone oils include those of the reaction setting type, those of the photosetting type and those of the catalytic setting type.

Examples of reaction setting type silicone oils include those obtained by reaction setting of amino-modified silicone oil and epoxy-modified silicone oil.

Examples of catalytic setting type or photosetting type silicone oils include KS-705F-PS, KS-705F-PS-1 and KS-770-PL-3, all are of the catalytic setting type, produced by Shin-Etsu Chemical, and KS-720 and KS-774-PL-3, all are of the photosetting type, produced by Shin-Etsu Chemical It is preferable that the addition weight of these setting type silicone oils be 0.5 to 30% by weight of the image receiving layer binder.

A parting agent layer may be formed on a part of the surface of the image receiving layer by coating and drying a solution or dispersion of the parting agent described above in an appropriate solvent.

Examples of the antioxidant described above include the antioxidants disclosed in Japanese Patent Publication Open to Public Inspection Nos. 182785/1984 and 127387/1989, and known compounds which improve the image durability in photographic and other image recording materials.

Examples of the UV absorbent and light stabilizer described above include the compounds disclosed in Japanese Patent Publication Open to Public Inspection Nos. 158287/1984, 182785/1984, 74686/1989, 145089/1989, 96292/1984, 130735/1985, 118748/1986, 153638/1986, 59644/1986, 229594/1987, 122596/1989, 283595/1986 and 04788/1989, and known compounds which improve the image durability in photographic and other image recording materials.

Examples of the filler described above include inorganic fine grains and organic resin grains.

Examples of the inorganic fine grains include silica gel, calcium carbonate, titanium oxide, acid clay, activated clay and alumina. Examples of the organic fine grains include resin grains such as fluorine resin grains, guanamine resin grains, acryl resin grains and silicone resin grains. It is preferable to add these inorganic or organic resin grains at 0.1 to 70% by weight, though the addition amount varies depending upon the specific gravity.

Examples of the pigment described above include titanium white, calcium carbonate, zinc oxide, barium sulfate, silica, talc, clay, kaolin, activated clay and acid clay.

Examples of the plasticizer and heat solvent described above include phthalates e.g., dimethyl phthalate, dibutyl phthalate, dioctyl phthalate, didecyl phthalate, adipates e.g., dioctyl adipate, methyllauryl adipate, di-2-ethylhexyl adipate, ethyllauryl adipate, oleates, succinates, maleates, sebacates, citrates, epoxystearates, phosphates such as triphenyl phosphate and tricresyl phosphate, and glycol esters such as ethylphthalylethyl glycolate and butylphthalylbutyl glycolate.

In the present invention, the total addition amount of additives is normally 0.1 to 50% by weight of the image receiving binder.

The surface of the thermoplastic resin layer may be laminated with an overcoat layer for purposes such as prevention of hot adhesion and improvement in image preservability. This layer may be formed by an ordinary coating or lamination method. This layer normally has a thickness of 0.05 to 5 μm. Between the substrate and image receiving layer described above of the thermal transfer recording image receiving sheet, a cushion layer may be formed to ensure high reproducibility transfer recording of an image corresponding to the image information by reducing noises.

Examples of materials for this cushion layer include urethane resins, acryl resins, ethylenic resins, butadiene rubber and epoxy resins.

It is preferable that the cushion layer have a thickness of 5 to 25 μm.

Examples of the actinic radiation setting composition to form the protective layer of the present invention include ultraviolet setting compositions. Although there is no limitation on the choice of an ultraviolet setting protective composition, it is preferable to use a composition whose main components are a prepolymer containing two or more epoxy groups per molecule and an aromatic onium salt as cationic polymerization initiator, with further preference given to a composition having a prepolymer containing two or more epoxy groups per molecule in a ratio by weight of not less than 70% to the composition. Any prepolymer can be used, as long as it contains two or more epoxy groups per molecule, including all known prepolymers. Examples of such prepolymers include alicyclic polyepoxides, polybasic acid polyglycidyl esters, polyhydric alcohol polyglycidyl ethers, polyoxyalkylene glycol polyglycidyl ethers, aromatic polyol polyglycidyl ethers, hydrogenated compound of aromatic polyol polyglycidyl ethers, urethane polyepoxy compounds, and epoxidated polybutadienes. These prepolymers may be used in blend of two or more kinds. The preferable cationic polymerization initiator is an aromatic onium salt, including onium salts comprised of elements in the group Va in the periodic table of elements, such as phosphonium salts, e.g., triphenylphenacylphosphonium hexafluorophosphate, onium salts comprised of elements in the group VIa such as sulfonium salts, e.g., triphenylsulfonium tetrafluoroborate, triphenylsulfonium hexafluorophosphate, tris-(4-thiomethoxyphenyl)sulfonium hexafluorophosphate and triphenylsulfonium hexafluoroantimonate, and onium salts comprised of elements in the group VIIa such as iodonium salts e.g., diphenyliodonium chloride.

Use of an aromatic onium salt as a cationic polymerization initiator for epoxy compound polymerization is described in detail in U.S. Pat. Nos. 4,058,401, 4,069,055, 4,101,513 and 4,161,478.

The preferred cationic polymerization initiator is a sulfonium salt comprised of an element in the group VIa. From the viewpoint of ultraviolet setting property and storage stability, triarylsulfonium hexafluoroantimonate is preferred.

The amount of the cationic polymerization initiator described above is preferably 3 to 20% by weight to the total weight of the prepolymer-containing ultraviolet setting composition, more preferably 5 to 12% by weight.

The ultraviolet setting composition used for the present invention can further contain oils, particularly silicone oil, surfactants such as silicone-alkylene oxide copolymers, e.g., L-5410, commercially available from Union Carbide, silicone-oil-containing aliphatic expoxides, and fluorocarbon surfactants such as FO-171 and FO-430, both commercially available from 3M Co., and Megafac F-141, commercially available from Dainippon Ink and Chemicals, Inc.

The ultraviolet setting composition used for the present invention may be further formulated with inert components such as talc, calcium carbonate, alumina, silica, mica, barium sulfate, magnesium carbonate, glass powder and other fillers, dyes, pigments, thickeners, plasticizers, stabilizers, leveling agents, coupling agents, tackifiers, wettability improving agents such as silicone-group-containing surfactants and fluorocarbon-group-containing surfactants, and other additives. Also, it is possible to add a small amount of a solvent which is hardly reactive with the cation polymerization initiator described above, such as acetone, methyl ethyl ketone or methyl chloride, to improve the fluidity of the composition during coating.

Also, the ultraviolet setting composition used for the present invention may be further formulated with vinyl monomers such as styrene, p-methylstyrene, methacrylate, acrylate, and monoepoxides of cellulose, thermoplastic polyester, phenylglycidyl ether, silicon-containing monoepoxide, butylglycidyl ether, as long as the effect of the invention is not interfered with.

The ultraviolet setting composition used for the present invention sets in response to irradiation of a light in the ultraviolet band. Examples of sources of ultraviolet radiation (hereinafter also simply referred to as ultraviolet) include solar rays, low pressure mercury lamps, high pressure mercury lamps, ultrahigh pressure mercury lamps, carbon arc lamps, metal halide lamps and xenon lamps.

The atmosphere for ultraviolet irradiation may be air or an inert gas such as nitrogen gas or carbon dioxide gas.

Ultraviolet irradiation time for the ultraviolet setting composition used for the present invention varies depending on the type of ultraviolet irradiation source, but is generally 0.5 second to 5 minutes, preferably 3 seconds to 2 minutes.

Generally, when the irradiation time is short, a large light source with high irradiation intensity is needed. When the irradiation time is long, a light source with low irradiation intensity may be used, but setting action time increases, which is disadvantageous for the preparation process. On the other hand, the present invention is advantageous in that the purpose of irradiation is accomplished with an irradiation time of 3 seconds to 2 minutes using an ultraviolet generating lamp under 200 W.

Setting time can be further shortened by adding a heating process before, during or after ultraviolet irradiation.

When heating is conducted, the heating temperature is preferably 30° to 80° C. Prior to ultraviolet irradiation, the heating time may be short or long, as long as the ultraviolet setting composition layer becomes heated to this temperature. After ultraviolet irradiation, the heating time is prefeably 1 to 120 minutes.

In addition to the ultraviolet setting resin composition exemplified above, other active radiation setting resin compositions may be used in the same manner as above according to the properties of the activation energy ray and composition.

Such a resin composition may be coated on the uppermost layer, e.g., an image forming layer, of the support, e.g., a belt support, as a liquid resin material. To coat the liquid resin material on the layer surface, ordinary methods such as double roll coating, slit coating, air knife coating, wire bar coating, slide hopper coating and spray coating can be used to coat the material solution. These methods permit simple coating on card surface. It is appropriate that the coating thickness be about 0.1 to 3 μm, preferably 1 to 15 μm.

In the present invention, a thermal transfer printing material is used to record an image with hot melt thermal transfer ink. This thermal transfer printing material has a support and an ink layer. This support is provided with a film base for ink ribbon support having a film thickness of 3 to 12 μm made of polyester, polyamide, polyimide, polyvinyl chloride, polyvinylidene chloride, polyvinylidene fluoride, polyacrylate, polyolefin, polycarbonate, polystyrene, phenol resin, cellulose triacetate, condenser paper, glassine paper, for instance. The support may have a backcoat (BC) layer. In addition to the ink layer, an interlayer, an overcoat (OC) layer and other layers may be provided as hot melt transfer layers.

The hot melt transfer layer may be made of any material, as long as it offers adhesion to the base material. Generally, it comprises the following materials.

Any known dyes and pigments can be used, including carbonates of alkaline earth metals, $TiO_2$, MgO, ZnO, alumina, silica, carbon black, Nigrosine dye, Sudan Black SM, Fast Yellow G, Benzidine Yellow GG, Pigment Yellow, Oil Yellow, Zapon Fast Yellow CG, Sumiplast Yellow GG, Indo Fast Orange, Sumiplast Orange G, Pigment Orange R, Zapon Fast Orange GG, Irgadine Red, Rose Nitroaniline Red, Toluidine Red, Lithol Red 2G, Lake Red 0, Oil Scarlet, Zapon Fast Scarlet OG, Aizen Spiron Red BEH, Methyl Violet B Lake, Phthalocyanine Blue, Pigment Blue, Fastogen Blue 5007, Victoria Blue F4R, Sudan Blue, Oil Peacock Blue, Brilliant Green B and Phthalocyanine Green.

Examples of waxes include carnauba wax, montan wax, beeswax, rice wax, candelilla wax, lanolin wax, paraffin wax, microcrystalline wax, polyethylene wax, SASOL WAX, oxidized wax, amide wax and silicon wax.

Examples of thermoplastic resins include polyamide resins e.g., nylon, polyester resins, poly(meth)acrylate resins e.g., polymethyl methacrylate, polyethyl acrylate, polyurethane resins, polyvinyl chloride resins, polyvinylidene chloride resins, polystyrene resins, polyvinyl acetate resins, polyvinyl chloride-vinyl acetate resins, polystyrene-acryl resins, polyethylene-vinyl acetate resins, polyethylene resins, polypropylene resins, polybutadiene resins, polyvinyl alcohol resins, phenol resins, cellulose resins e.g., methyl cellulose, ethyl cellulose, carboxymethyl cellulose, nitrocellulose, acetyl cellulose, polyvinyl ether resins, polyvinylpyrrolidone resins, polyvinylaniline resins, polysulfone resins, polycarbonate resins, ionomer resins, polysiloxane resins, acetal resins e.g., polyvinyl butyral, polyvinyl acetal, polyvinyl formal, petroleum resins, rosin resins, chroman-indene resins, terpene resins, styrene-butadiene rubbers, isoprene rubbers and nitro rubbers.

Examples of additives include various surfactants, higher fatty acids e.g., stearic acid, palmitic acid, lauric acid, long-chain alcohols e.g., stearyl alcohol, metal salts of long-chain fatty acid e.g., calcium stearate, zinc palmitate, antioxidants, various plasticizers and silicon oil.

The preferred content ratios of these materials significantly differ according to the layer composition used. The ink layer may be of the multiple layer structure for efficient thermal transfer by heating. For example, the following layers may be laminated on the base material in this order. These combinations are not to be construed as limitative.

1) Parting layer, colorant layer.
2) Parting layer, colorant layer, adhesion layer.
3) Colorant layer, adhesion layer.

In the present invention, all images expressed may be formed singly by the sublimational thermal transfer printing method, heat developing method or other method. However, from the viewpoint of running cost reduction and preparation time reduction, it is preferable to use the hot melt thermal transfer printing method to form images for the monotonous image portions where fine gradation is not required such as character and symbol images.

EXAMPLE

Figure 2:
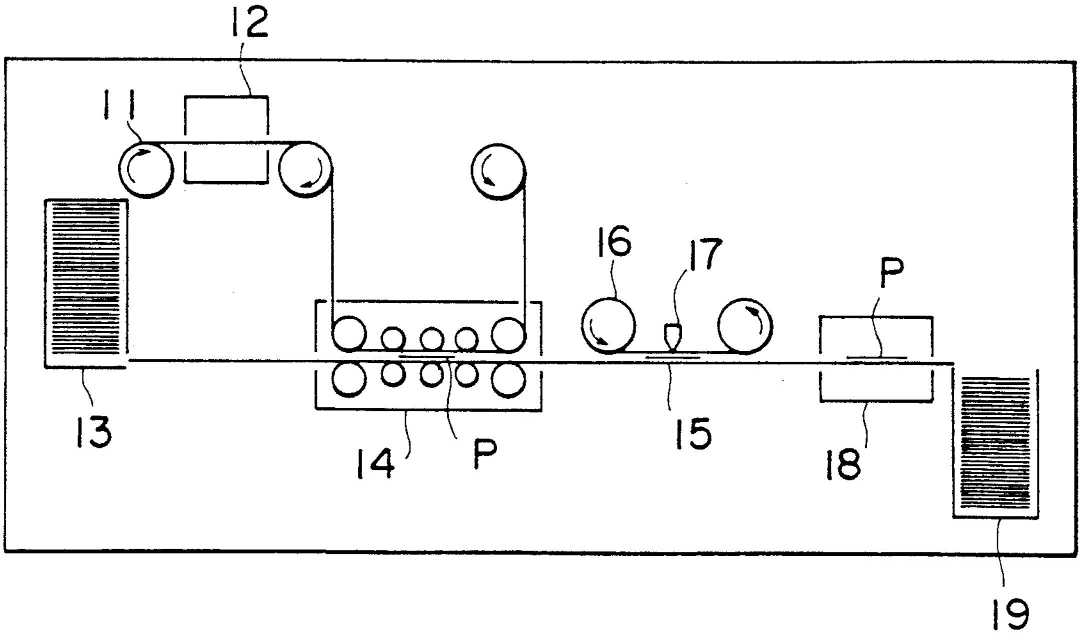

The method of image formation of the present invention is described specifically for the example image forming apparatuses illustrated in FIGS. 1 and 2.

FIG. 1 shows a mode of photographic image transfer printing by the sublimational thermal transfer printing method. Symbol 1 represents an ink ribbon supplying part; the ink ribbon being brought into close contact with the card P transported from the card supplying part 2 at the photographic image recording part 3, and is heated according to photographic image information by thermal head 4, whereby the dye is transferred onto the thermoplastic resin layer on the card P. Subsequently, the hot melt thermal transfer printing ink ribbon transported from the hot melt thermal transfer printing ink ribbon supplying part 6 is brought into close contact with the card P at the character image recording part 5, and is heated according to character image information by the thermal head 7, whereby the characters are transferred onto the thermoplastic resin layer on the card P.

Then, the card P is transported to the actinic radiation setting resin composition coating part 8, where the active radiation setting composition is coated. An appropriate coating method is selected out of the methods described above. Subsequently, the card P is transported to the ultraviolet irradiation part 9, where it is irradiated with ultraviolet ray for 10 to 20 seconds, after which it is transported to the card receiving part 10, whereby a photographic-image-bearing recording member is obtained.

FIG. 2 shows a mode of transfer image formation using the heat developing type silver halide color photographic light-sensitive material.

Symbol 11 represents a heat developable light-sensitive material supplier. The heat developable light-sensitive material is supplied from a roll of the heat developable light-sensitive material to image exposure part 12, where the material is exposed to laser beam to obtain an image. As well as laser exposure, CRT, FOT, light emitting diode and other light sources may be used for exposure. The light-sensitive layer surface of the exposed heat developable light-sensitive material and the thermoplastic resin surface of the card fed from card feed part 13 are brought into close contact with each other, and the card P is transported between the heating rollers in heat development part 14, during which an image is formed on the card P. It is preferable that the heating time be 20 seconds to 2 minutes.

Subsequently, at the character image recording part 15, the hot melt thermal transfer printing ink ribbon transported from the hot melt thermal transfer printing ink ribbon supplying part 16 is brought into close contact with the card P, and is heated according to the character image information by the thermal head 17, whereby the characters are transferred onto the card P.

Then, the card P is transported to protective layer forming part 18, which also serves as radiation setting composition coating part and ultraviolet irradiation part, where a protective layer is formed by coating of radiation setting composition and ultraviolet irradiation, then the card is transported to card receiving part 19, whereby a photographic-image-bearing recording member is prepared.

The above description refers to the case where a thermoplastic resin has been formed on the card-shaped support, but it is also possible to bring the card-shaped support and this resin into close contact with each other after forming an image in the thermoplastic resin. Examples of heat developing type light-sensitive materials usable for the present invention are described in Japanese Patent Publication Open to Public Inspection Nos. 52147/1989 and 114844/1989 and the Journal of the Society of Photographic Science and Technology of Japan, 52, 167-171 (1989).

Figure 3:
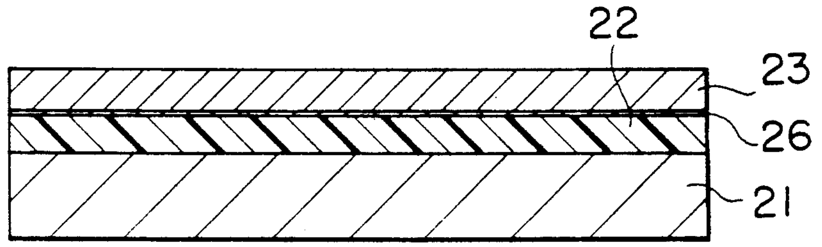
FIGS. 3 and 4 show an example of a photographic-image-bearing recording member for side view in FIG. 3 and plan view in FIG. 4.
Figure 4:
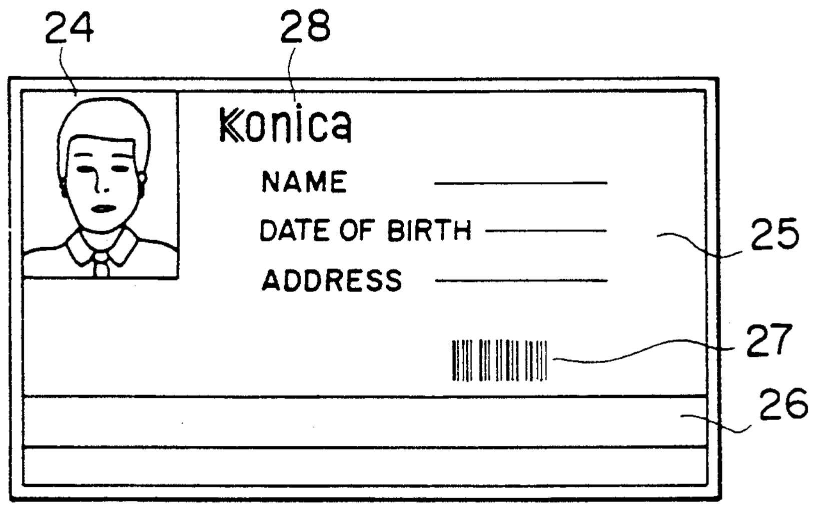

FIGS. 3 and 4 show a side view and a plain view of a photographic-image-bearing recording member.

Symbol 21 represents a support, comprising white polyvinyl chloride of 0.7 mm in thickness and symbol 22 represents a thermoplastic resin layer wherein photographic portrait 24 and character image 25 are recorded. Symbol 26 represents a magnetic recording layer.

A thermoplastic resin layer of 5 $\mu$m in thickness was formed by coating an image receiving layer coating solution of the following composition by the wire bar coating method and pre-drying using a dryer followed by main drying in an oven at a temperature of 100° C. for 1 hour. Image receiving layer coating solution Vinyl chloride-vinyl acetate copolymer 10 parts (trade name VYHH, produced by Union Carbide) Methyl ethyl ketone 90 parts Symbol 23 represents a protective layer prepared by coating one of the coating compositions 1 through 3 described below in a coating ratio of 10 g/m$^2$ and irradiating it with high pressure mercury lamp of 60 W/cm$^2$ at a transportion speed of 3 m/min at a distance of 10 cm from the high pressure mercury lamp to set the coating composition. The cards having protective layers with respective compositions are called Sample A1 through A3.

Coating composition 1

1) Bis(3.4-epoxy-6-methylcyclohexylmethyl)adipate (ERL-4299, produced by UCC Co.) 70 parts by weight
2) Bisphenol A diglycidyl ether (Epotot YD 8124, produced by Toto Chemical Co., Ltd.) 10 parts by weight 3) 1,4-butanediol diglycidyl ether (RD-2, produced by Chiba Geigy) 12 parts by weight 4) Triarylsulfonium hexafluoroantimonate solution 8 parts by weight Coating composition 2

1) Hydrogenated bisphenol A diglycidyl ether (Adeka Resin EP 4080, produced by Asahi Denka) 30 parts by weight 2) Diglycidyl hexahydrophthalate (Araldite CY 183, produced by Chiba Geigy) 23 parts by weight 3) Epoxidated polybutadiene (Poly bd R-45 EP7, produced by Idamitsu Petrochemical Co., Ltd.) 40 parts by weight 4) Triphenylsulfonium hexafluoroantimonate solution (UVE-1014, produced by GE) 7 parts by weight Coating composition 3

1) Pentaerythritol acrylate (Biscoat 300, produced by Osaka Yuki Kagaku Kogyo) 53.4 parts by weight 2) γ-methacryloxypropyltrimethoxysilane (KBM 503, produced by Shin-Etsu Chemical Co., Ltd.) 12.3 parts by weight 3) p-(3,4-epoxycyclohexyl)ethyltrimethoxysilane (KBM 303, produced by Shin-Etsu Chemical Co., Ltd.) 14.0 parts by weight 4) 1,4-butanediol diglydicyl ether 11.0 parts by weight 5) 4,4'-bischloromethylbenzophenol 4.3 parts by weight 6) Triarylsulfonium hexafluoroantimonate solution (UVE 1014, produced by GE) 5 parts by weight For comparative examples, Samples A4 and A5 were prepared in the same manner as with Samples A1 through A3 except that Sample A4 had no protective layers as of Samples A1 through A3, and Sample A5 were prepared by altering the protective layer to polyvinyl chloride, a protective layer of polyvinyl chloride was formed by overlaying a polyvinyl chloride sheet on the thermoplastic resin layer and compressing it while heating at 140° C. for 10 seconds.

Photographic images were recorded by the sublimational thermal transfer printing method, and symbol and character images were recorded by the hot melt thermal transfer printing method. Examples of each thermal transfer printing material are given below.

Hot melt thermal transfer printing materials for symbol and character images:

Support (4.5 μm in thickness)
PET film (Toray)
Heat resistant protective layer (0.2 μm in thickness)
Nitrocellulose 30 parts by weight
Acryl silicon resin 70 parts by weight
Parting layer (0.9 μm in thickness)
EV-210 (Du Pont-Mitsui Chemicals) 5 parts by weight
Paraffin wax (Nippon Seiro) 95 parts by weight
Colorant layer (1.0 μm in thickness)
Carbon black 20 parts by weight
TAMANOL 526 75 parts by weight
EV-40Y 5 parts by weight Sublimational thermal transfer printing materials for photographic images:

Thermal transfer recording ink sheets for yellow, magenta and cyan colors were obtained by coating and drying an ink layer coating solution of the following composition on a corona-treated surface of a support comprising a polyethylene terephthalate film (produced by Toray) of 6 μm in thickness by the wire bar coating method to a dry thickness of 1 μm, and dropwise adding 1 or 2 drops of silicon oil (X-41 4003A, produced by Shin-Etsu Silicone) and spreading it over the entire area of the opposite face not subjected to corona treatment for a backcoat treatment.

Ink layer coating solution:

Disperse dyes

1. Yellow: MS Yellow (produced by Mitsui Toatsu Senryo) 3 parts by weight
2. Magenta: MS Magenta (produced by Mitsui Toatsu Senryo) 5 parts by weight
3. Cyan: Kayaset Blue 136 (produced by Nippon Kayaku) 4 parts by weight Polyvinyl butyral (degree of polymerization 1700, trade name BX-1, produced by Sekisui Chemical) 5 parts by weight Methyl ethyl ketone 90 parts by weight Cyclohexanone 5 parts by weight Also, the thermoplastic resin layer 22 contained silicon oil as parting agent and image stabilizers such as the following UV absorbent.

UV absorbent

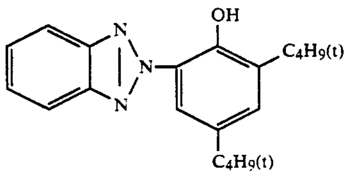

The image sharpness in the samples A1 through A5 thus obtained, particularly in the photographic image portions, was evaluated macroscopically; color staining due to dye diffusion was noted in the sample A5 alone. The samples A1 through A5 were stored at a temperature of 80° C. for 3 days while being superposed on plain paper for electrophotographic copying; transfer of some of the image-forming dye to the paper was noted in the sample A4 alone. Also noted was deterioration of sharpness after storage in the samples A4 and A5.

Another sample A6 was prepared in the same manner as with the sample A5 except that the thermal pressure adhesion conditions were altered to 120° C. and 5 seconds. Although the sharpness did not deteriorate in the sample A6, peeling of the protective layer 23 and the thermoplastic resin layer 22 occurred during storage at a relative humidity of 80% and a temperature of 50° C. in the sample 6 alone. In short, the sample A6 has no sufficient protective function for the prevention of falsification.

As other examples of the embodiment of the present invention, sample B was prepared in the same manner as with sample A1 except that not only photographic images but also symbol and character images were formed by the sublimational thermal transfer printing method. This sample B was subjected to the same treatment as with samples A1 through A6 to yield samples B1 through B6, which were then evaluated in the same manner as with samples A1 through A6. Exactly the same results were obtained.

Also, the samples A1 and B1 were compared with respect to preparation cost and time. A1 was found to be obtainable at roughly half cost and about two-thirds preparation time in comparison with sample B1.

What is claimed:

1. A photographic image-bearing recording member comprising:

a support, a thermoplastic resin layer bearing a photographic image therein, which is provided on a surface of said support, and a protective layer produced by irradiating with actinic radiation a coating layer comprising a radiation setting composition having a prepolymer containing at least two epoxy groups per prepolymer molecule, which protective layer is provided at an outermost position of said photographic image-bearing recording member on the side of the support on which said thermoplastic layer is provided.

2. The recording member of claim 1, wherein said thermoplastic layer bears a photographic image comprising a dye or a pigment and further bears a symbol or a character which is transferred from a melt-type heat-transfer material.

3. The recording member of claim 1, wherein said thermoplastic layer comprises a polymer having a glass transition temperature of from 40° C. to 250° C. and a plasticizer.

4. The recording member of claim 1, wherein said radiation setting composition comprises a prepolymer having at least two epoxy groups in the molecule thereof and an aromatic onium salt as a cationic polymerization initiator.

5. The recording member of claim 1, wherein said composition has a prepolymer content of not less than 70% by weight to said composition.

6. The recording member of claim 1, wherein said thermoplastic resin layer comprises a binder selected from the group consisting of polyvinyl chloride resins, copolymer resins of vinyl chloride and another monomer, polyester resins, ketone resins, alkyd resins, polyvinylpyrrolidone, polycarbonates, cellulose triacetate, polyacrylate resins, styrene acrylate resins, vinyltoluene acrylate resins, polyurethane resins, polyamide resins, urea resins, polycaprolactone resins, polyacrylonitrile resins, and polyvinylbutyral.

7. The recording member of claim 1 wherein said thermoplastic resins layer comprises a binder selected from the group consisting of vinyl chloride-vinyl acetate copolymer resins, polyester resins and polyvinyl chloride resins.

8. The recording member of claim 1, wherein said protective layer is provided on the thermoplastic layer.

* * * * *